Patented Jan. 28, 1941

2,229,975

UNITED STATES PATENT OFFICE 2,229,975

ART OF TREATING TEXTILE FABRICS

Philip Kaplan, Teaneck, N. J., assignor to The Richards Chemical Works, Incorporated, Jersey City, N. J., a corporation of New Jersey No Drawing. Application January 6, 1940,
Serial No. 312,681

7 Claims. (Cl. 28—1)

This invention relates generally to the art of treating fibrous materials and, more specifically, to certain novel compositions for use in the treatment of such materials.

In manufacturing and treating fibrous materials such, for example, as cotton, wool, natural or artificial silk, glass and other fibers, whatever their origin, and in the conversion of these fibers into yarns, threads and finished products, like textile fabrics, it is the general practice to employ oils or oily compositions to facilitate the manufacturing processes and to impart certain desirable characteristics to the products themselves.

The oil has a multiplicity of functions in the manufacture and treatment of fibrous materials. One of its most important functions, perhaps its primary function, is that of lubrication, in that it enables the material being treated to withstand machine operations without injury and abrasion and to readily advance or otherwise move in the course of manufacture. Another function is to impart desired softness and pliability to the material and to retard or prevent the evolution of electrostatic forces while the manufacturing procedure is in progress. Still another function is to act as a protectorant for the fiber and the product made therefrom, in that the oil or finishing compositions containing the same will tend to obviate malodorousness, polymerization, gum formation, tendering of fiber and other undesirable phenomena.

A great variety of oils is available for the purposes above outlined, but so far as I am aware none has proven wholly satisfactory. Some are too expensive for general use, others tend to oxidize readily while still others become sluggish and heavy in a very short time. As a consequence, there is an imperative need for an oil which while reasonable in price will satisfactorily perform all the functions and fulfill all the requirements expected of such oils.

The principal object of my invention is to provide an oil which is free of the objections inherent in oils of the prior art and which may be used equally successfully in the treatment of all kinds of fibrous materials, paper and leather.

Another object of the invention is to improve the art of manufacturing and treating fibrous and like materials by the provision of an effective lubricant, protectorant and softening and finishing agent.

In accordance with my invention, I accomplish these and other kindred objects by the provision of an oil obtained from the seeds of grapefruit. For the purpose of the present invention this oil may be employed in unmodified form or in sulfonated or saponified form, and it may be used alone or in combination with other oils or substances or compounds as more fully hereinafter set forth.

Any suitable procedure may be employed to obtain the oil from the seeds. The desirable procedure is mechanical rather than chemical. I have found that grapefruit seed oil contains a bitter principle of an alkaloidal nature and for reasons hereinafter explained I desire to retain this bitter principle in the final product. If chemical procedure were used to recover the oil from the seed the permanent retention of this bitter principle might be endangered. A desirable mechanical method of recovering the oil from the seeds comprises soaking the seeds in water to effect decomposition of the cortex by fermentation, drying the seeds thus pulped, employing an Anderson expeller to express the oil from the pulp, filtering the product, settling out the oil, decolorizing if necessary or desirable and subjecting the oil to whatever subsequent treatment may be suitable for the purpose or use to which the oil is to be put.

As above intimated, the grapefruit seed oil of my invention may be sulfonated or saponified and as both sulfonation and saponification of oils are procedures well known in the art I deem it superfluous to describe such procedures in detail. Suffice it to say that sulfonation may be effected by appropriately treating the oil with well known sulfonating agents, such as $SO_3$, oleum, sulfuric acid, chlorsulfonic acid and the like, and saponification may be effected by the use of any appropriate alkaline agent normally used in the art for this purpose.

Both the sulfonated and saponified grapefruit seed oils of my invention are water-dispersible or soluble products in which all the valuable properties present in the raw oil are fully retained.

While, as stated above, the grapefruit seed oil may be used alone or together with other water-immiscible oils or substances as a textile treating agent, I find that such compositions may be made water dispersible and readily removable from fibres by mixing the compositions with appropriate emulsifiers or other dispersing agents. Emulsifiers adapted to the purpose are soaps or organic base salts of fatty acids, such as the fatty acids of grapefruit seed oil, sperm oil, olive oil, coconut oil and other animal and vegetable oils, and other dispersing agents which I may use are mineral oil sulfonates.

The foregoing compositions comprising raw and/or sulfonated grapefruit seed oil may have included therein other animal, vegetable or mineral oils, as well as soaps, esters, amides, ketones and other suitable fatty derivatives thereof. Synthetic fatty acid esters, such as the methyl, ethyl, propyl, isopropyl, butyl, isobutyl, etc., alcoholic esters of lauric, capric, caprylic, oleic, stearic, palmitic, myristic, ricinoleic, etc. acids, may be blended with raw and/or sulfonated grapefruit seed oil compositions. In general esters of both saturated or unsaturated fatty acids with monohydric alcohols having less than 10 carbon atoms may be used. Grapefruit seed oil may be further modified by subjecting the same to blowing according to known methods. A composition comprising blown grapefruit seed oil and a synthetic fatty acid ester of the aforementioned type is valuable in treating textiles.

Any suitable fibrous material, such as textiles, paper, leather, etc. may be treated according to my invention. The textile material treated may be in the form of loose fibers, yarns, staple-fiber, threads, felts, knitted fabrics, woven fabrics, etc. and which may be composed of any one or more of the following: cotton, wool, ramie, hemp, flax, cellulose, cellulose hydrate, cellulose esters, casein, glass, synthetic resins, or other suitable materials whether of animal, vegetable, mineral or synthetic origin.

The bitter principle present in the raw grapefruit seed oil, and which in accordance with my invention is retained in the final product, whatsoever its form, is believed to have the power of inhibiting oxidation and rancidity in saponifiable oils whether of vegetable, animal or mineral origin. Oxidation and racidity have a deleterious effect on fibres and fabrics, manifesting themselves in brittleness and malodorousness of the articles, and the prevention of these undesirable characteristics is highly valuable and important.

The following examples will serve to further elucidate my invention and are not to be deemed as limiting the same.

*Example I*

Prior to winding on bobbins, rayon yarn (composed of cellulose acetate or cellulose hydrate) is passed through a bath of grapefruit seed oil or the oil is applied to the yarn by means of wicks, rolls or otherwise. Yarn thus lubricated will remain free from oxidation for a much longer period of time than will the same yarn treated with olive oil or like oil. After scouring, the treated yarn will respond to even dyeing due to the freedom of the oil from oxidation.

*Example II*

The grapefruit seed oil composition set forth under Example I may be rendered water-dispersible by blending therewith a sulfonated oil, such as grapefruit seed, olive, castor, corn, sperm, etc. and applied to the yarn as a coning oil or in any other suitable manner. This lubricant will be substantially self-scouring and may be readily removed after weaving or knitting by simple scouring.

*Example III*

In the event that it is desirable to include a mineral oil, the following composition may be employed with success:

| | Per cent |
|---|---|
| Mineral oil | 50 |
| Grapefruit seed oil | 20 |
| Sulfonated oil | 30 |

This product may be applied to the yarns as a coning oil.

While cellulose fibers have been specifically mentioned under Examples I, II and III, it is to be understood that the other fibers hereinbefore disclosed may also be treated according to the procedure set forth in these examples.

*Example IV*

Grapefruit seed oil having a suitable quantity (5% to 50%) of a synthetic ester of a fatty acid, such as methyl or ethyl oleate or the like, is used for lubricating or finishing textile materials. In view of the property of these esters to eliminate or retard the development of static, the inclusion thereof in compositions for lubricating cellulosic and other yarns prone to the development of static electricity is highly desirable. The lubricant may be removed by scouring with an alkali metal or nitrogenous base soap of any suitable oil or fatty acid.

*Example V*

In the soaking of raw natural silk, sulfonated grapefruit seed oil may be blended with raw grapefruit seed, sperm or any other suitable oil. Moreover, grapefruit seed oil may be blended with sulfonated sperm, tea-seed or any other suitable oil. After soaking, the yarn may be directly spun or thrown before knitting or weaving operations.

*Example VI*

In the treatment of worsted materials, a composition comprising blown grapefruit seed oil and a synthetic fatty acid ester may be employed. Such a composition displays excellent lubricating and finishing properties for fabrics other than worsted as well. The synthetic ester may be produced by esterifying grapefruit seed oil fatty acids with an alcohol having less than 10 carbon atoms.

*Example VII*

In the finishing of textiles, a composition comprising sulfonated grapefruit seed oil greatly enhances the characteristics of the fabric, such as the feel, hand, drape, appearance, etc. Paraffin or other animal, vegetable or mineral oils may be used in combination with sulfonated grapefruit seed oil. The composition may be applied by means of spraying, a roller, felt, by running the textile through a bath or by other suitable means. Such compositions may be dispersed in the final rinse water used in laundries to replenish in the fabric the finishing agent removed during the washing operation.

*Example VIII*

In the fat liquoring of leather, the following composition has produced excellent results:

| | Per cent |
|---|---|
| Grapefruit seed oil | 30 |
| Sulfonated fish or other oil | 60 |
| Water | 10 |

Irrespective of the particular use for which the raw and/or sulfonated grapefruit seed oil compositions are to be put, the proportion of these and other constituents may be varied to suit conditions. The proportion of grapefruit seed oil or its chemical derivatives may be determined by the degree of oxidation permissible in the material under treatment and upon the degree of softness and other properties desired.

I claim:

1. In the treatment of textile fibers, the step which comprises applying to textile fibers a composition of matter comprising grapefruit seed oil.

2. In the treatment of textile fibers the step which comprises applying to textile fibers a composition of matter comprising sulfonated grapefruit seed oil.

3. In the treatment of textile fibers, the step which comprises applying to textile fibers an emulsifiable composition of matter comprising grapefruit seed oil.

4. In the treatment of textile fibers, the step which comprises applying to textile fibers a composition of matter comprising grapefruit seed oil and an ester of a higher fatty acid with a monohydric alcohol having less than 10 carbon atoms.

5. In the treatment of textile fibers, the step which comprises applying to textile fibers an emulsifiable composition of matter comprising grapefruit seed oil and an ester of a higher fatty acid with a monohydric alcohol having less than 10 carbon atoms.

6. In the treatment of textile fibers, the step which comprises applying to textile fibers a composition comprising grapefruit seed oil and a sulfonated material.

7. In the treatment of textile fibers, the step which comprise applying to textile fibers a composition comprising sulfonated grapefruit seed oil and a product selected from the group consisting of raw or sulfonated animal, vegetable and mineral oils.

PHILIP KAPLAN.